US010101216B2

(12) United States Patent
Lesage

(10) Patent No.: US 10,101,216 B2
(45) Date of Patent: Oct. 16, 2018

(54) CONDUIT FOR THE REOMOVABLE POSITIONING OF TEMPERATURE SENSORS IN A WATER HEATER AND METHOD

(71) Applicant: MICLAU-S.R.I. INC., Montreal East (CA)

(72) Inventor: Claude Lesage, Pointe-Claire (CA)

(73) Assignee: MICLAU-S.R.I. INC., Zoave Lesage, Montreal ( * ) Notice: Subject to any disclaimer, the term of this patent is extended or adjusted under 35 U.S.C. 154(b) by 583 days.

(21) Appl. No.: 14/544,994

(22) Filed: Mar. 16, 2015

(65) Prior Publication Data

US 2016/0273969 A1 Sep. 22, 2016

(51) Int. Cl.
*F24H 1/20* (2006.01)
*G01K 1/14* (2006.01)
*F24H 9/20* (2006.01)

(52) U.S. Cl.
CPC .......... *G01K 1/146* (2013.01); *F24H 9/2014* (2013.01); *G01K 2207/00* (2013.01)

(58) Field of Classification Search
CPC ...... G01K 1/08; G01K 1/146; G01K 2207/00; F24H 9/2014

USPC ........ 219/486, 494, 497, 535; 392/402, 489, 392/502
See application file for complete search history.

(56) References Cited

U.S. PATENT DOCUMENTS

| 6,367,974 B1 * | 4/2002 | Lin | G01K 1/10 374/150 |
| 6,612,268 B1 * | 9/2003 | Peteri | F24H 1/182 122/19.2 |
| 2015/0323391 A1 * | 11/2015 | McCulloch | F24H 9/2007 374/185 |

FOREIGN PATENT DOCUMENTS

WO WO 2014087162 A1 * 6/2014 ........... F24H 9/2007

\* cited by examiner

*Primary Examiner* — Thien S Tran
(74) *Attorney, Agent, or Firm* — Goy J. Houle; Houle Patent Agency Inc.

(57) ABSTRACT

A passage is provided in a water heater and mounted against the outer surface of the water tank side wall to removably mount thermistors secured to a support at distinct locations along the tank side wall to provide temperature value signal representative of the water temperature in the tank adjacent the thermistors. The passage may be formed by a metal tube held next to the side wall of the tank or a U-shaped channel held against the outer surface of the tank wall with the through thereof facing the tank side wall outer surface. The thermistors are mounted spaced-apart on a support inserted in the passage. The method is also described.

13 Claims, 2 Drawing Sheets

CONDUIT FOR THE REOMOVABLE POSITIONING OF TEMPERATURE SENSORS IN A WATER HEATER AND METHOD

TECHNICAL FIELD

The present invention relates to a water heater having an access passage for removably mounting temperature sensors next to a water tank of the water heater for monitoring the temperature of the water inside distinct locations of the water tank and method.

BACKGROUND OF THE INVENTION

In order to control the temperature of the water in a water tank of a water heater, one or more temperature probes are usually permanently mounted in the wall of the tank and project inside the tank in contact with the water therein. In recent years, and due to the increase cost of electricity, more sophisticated control systems have been developed to control the operation of the water heater whereby to operate the resistive heating elements during non-peak hours when electricity costs are lowest to create a reserve of hot water for use during peak-hours to reduce the operating time of the elements when electricity is at a premium.

Utilities also have a need to take control of water heaters to prevent overcharging its grid during peak hours and to use its electricity when the demand is low as well as the cost. Such control would create an equilibrium or a mean demand of electricity of the grid. Still further, after power outages when electricity is restored, it is desirable for the utility to control the load to prevent an overload on the grid. Control devices have been developed and continue to be developed to remotely control the actuation of the resistive heating elements of the water heaters at the customer locations while attempting to satisfy the hot water demands of the customers. In order to achieve this, it is necessary to determine the hot water reserve inside the tank of the water heater. Accordingly, temperature sensors are required to provide actual temperature values at distinct locations of the water tank and particularly in the uppermost region of the tank where the hottest water is located and drawn.

Thermistors are excellent electrical components for sensing temperature variations as its resistance varies with temperature changes. Because the water tank is constructed of steel material which is a good thermal conductor, by sensing the temperature of the steel by mounting thermistors there against, the temperature of the water inside the tank can be fairly accurately determined. To ensure a desired hot water volume in the tank, it is necessary to monitor the temperature of the water in the region of the heating elements. Because the thermistors need to be mounted outside the water tank wall, there is often no access to these sensor components once the thermal insulation foam is injected about the tank wall sealing access to these devices and their wiring. Water heaters are now being manufactured with three resistive heating elements to achieve better control of the water temperature in the tank and by selecting the operation of the various heating elements, some of which may be of a much lower wattage than the others. Thus, three thermistors would be required to monitor the temperature of the tank wall in the region of the three resistive heating elements. Because of the insulation blown inside the gap formed between the outer skin of the water heater and the water tank, there would be a need to form foam dams about the thermistors and access doors in the outer casing for access to the thermistors in case of a defect. This is not practical and adds to cost. Also, it complicates the troubleshooting and repair and does not remedy a defective wiring problems that could occur between the thermistors.

Mounting the thermistors on the tank wall and sealing them with the foam insulation would require replacing the hot water heater to remedy a defective thermistor problem or a defective associated wiring problem inside the water heater.

SUMMARY OF THE INVENTION

It is a feature of the present invention to provide an access passage inside a water heater for removably mounting temperature sensors adjacent the water tank of the water heater and thereby overcoming the above mentioned problems.

Another feature of the present invention is to provide a method for removably mounting an elongated support having temperature sensors secured thereon and its wiring inside an elongated access passage formed of thermally conductive material and disposed nest to the tank wall whereby the temperature inside the passage is substantially the same as the adjacent tank wall and adjacent water inside the tank.

Another feature of the present invention is to provide a water heater having an access passage next to the tank wall for receiving an assembly of thermistors therein with the thermistors disposed at respective ones of distinct locations.

According to the above features, from a broad aspect, the present invention provides an elongated access passage for removably mounting temperature sensors adjacent a water tank of a water heater. The access passage is disposed vertically next to an outer surface of a water tank wall of the water heater. The access passage is dimensioned to receive one or more temperature sensors and a support thereof from a top access opening of the passage for positioning the one or more temperature sensors at distinct locations therein for sensing the temperature surrounding the one or more temperature sensors at the distinct locations.

According to another broad aspect of the present invention there is provided a water heater comprised of a water tank having means to heat the water inside the water tank. An outer casing is secured spaced from the surrounding side wall and the top wall of the water tank and defines an insulating gap there between to receive a thermally insulating material. An access passage of predetermined length extends vertically next to the surrounding side wall of the water tank for receiving therein two or more temperature sensors at distinct locations therein for sensing the temperature surrounding the two or more temperature sensors at the distinct locations.

According to a still further broad aspect of the present invention there is provided a method for removably mounting two or more temperature sensors adjacent a water tank of a water heater to obtain temperature readings representative of the water temperature inside the water tank at distinct locations thereof. The method comprises the steps of disposing an elongated vertical conduit vertically and next to an outer surface of the water tank. The conduit has an open top end. Two or more temperature sensors are secured to a support means for positioning the temperature sensors at respective ones of the distinct locations. The support means with the two or more temperature sensors is inserted in the open top end to position the two or more sensors at respective ones of the distinct locations. Wiring connected to the two or more temperature sensors is then secured to a controller device located externally.

DESCRIPTION OF THE DRAWINGS

A preferred embodiment of the present invention will now be described with reference to the accompanying drawings in which.

DESCRIPTION OF THE PREFERRED EMBODIMENT

Figure 1:
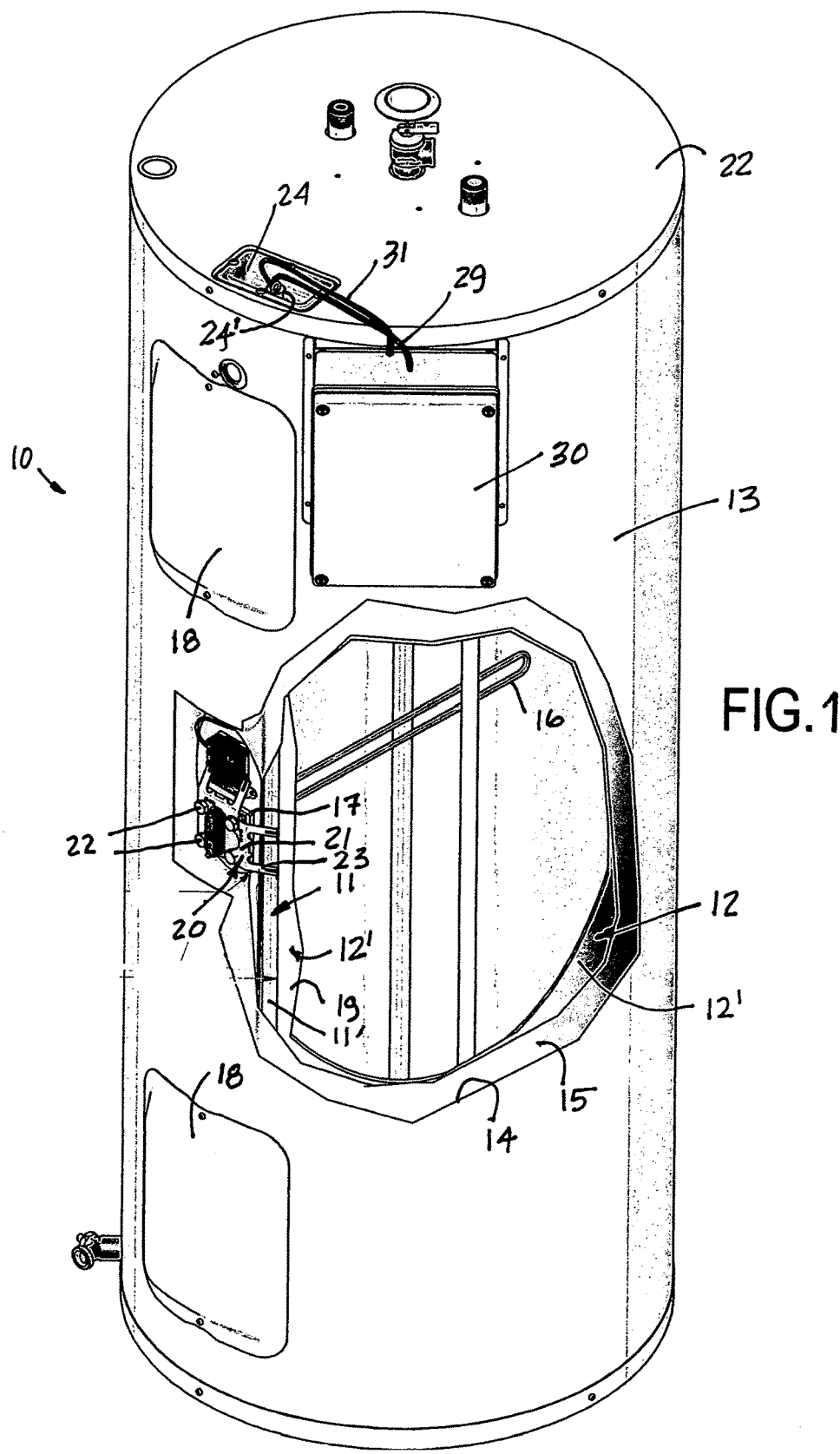
FIG. 1 is a fragmented perspective view of a water heater illustrating a preferred embodiment of the present invention.

Referring now to the drawings and more specifically to FIG. 1, there is shown generally at 10 a typical 3-element water heater fitted with an elongated access passage 11, herein a thermally conductive tube 11', of the present invention. The water heater 10 is only schematically illustrated and as herein shown comprises a water tank 12 and an outer casing 13 spaced about the surrounding side wall 12' of the tank 12 to define an insulating gap 14 in which an insulating foam material 15 in injected. The foam material 15 may be disposed in a plastic pouch 9, see FIG. 3, to prevent the foam from sticking to the tank wall and the inner surface of the outer casing 13, for ease of recycling. The water heater 10 has three resistive heating elements 16, only one being shown, mounted on the tank side wall 12' by a bolted flange 17. Access doors 18 provide access to the resistive heating elements for replacement when necessary. An insulating wool (not shown) is usually disposed in the open space behind the doors 18 which is sealed by a surrounding dam to prevent the expandable foam from expanding into this space.

Figure 5:
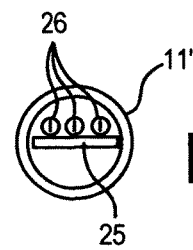
FIG. 5 is a cross-sectional view showing the circuit board disposed in close sliding fit inside the tube of circular cross-section.
Figure 6:
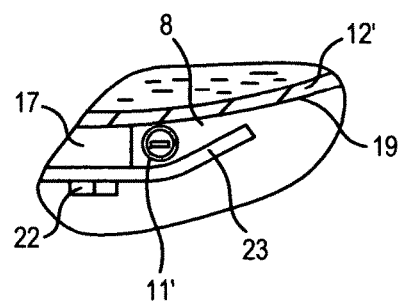
FIG. 6 is a fragmented view showing the tube held by a passage defining bracket.

With reference to additional FIGS. 2 to 6, the thermally conductive tube 11' is an elongated tube formed of thermally conductive metal, herein a stainless steel sheet of about 2 mm thickness. As shown in FIG. 6, the tube 11' is held captive against the outer surface 19 of the side wall 12' of the water tank 12 by a bracket 20 having an attachment portion 21 secured to the resistive heating element support flange 17 by the bolts 22 and a passage defining portion, herein arms 23 shaped to extend towards the surface 19 of the tank side wall 12' to define a restrained space 8 sized to receive the tube 11' there behind vertically next to the outer surface 19 of the tank side wall 12'. Only one bracket 20 is herein illustrated, but one is secured to all three clamp flanges 17. Accordingly, there is defined a restraining passage by the vertically aligned brackets 20 and the tube 11' is simply slid into the aligned restraining spaces 8 from the top one of the brackets 20.

Once the insulation 15 expands in the gap 14 it acts as a thermal seal on the tube and also hold the tube firmly in place against the tank side wall 12'. Because the tube 11' is in contact with the water tank outer surface 19 it assumes the same temperature as the tank wall 12' all along the tube with the lowermost portion being the coldest and the uppermost portion, which is the region of the top heating element 16 being the hottest. The air inside the tube 11' is also heated by the tube and assumes a temperature substantially the same as that of the tube and the side wall 12' of the tank as well as the water inside the tank at that specific location. The difference in temperature may be no more than about one degree F. Accordingly, the access passage, herein the tube 11', provides an air temperature environment representative of the temperature of the water at different locations inside the water tank. As well, it provides access for the removable mounting of temperature sensors and associated wiring should there be a need for replacement due to a defective component or conductor.

Figure 2:
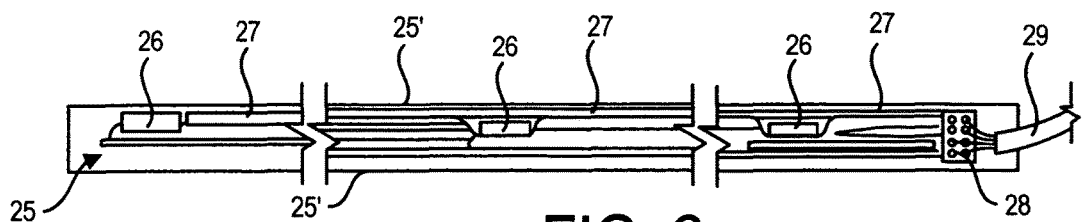
FIG. 2 is a fragmented plan view of an elongated printed circuit board support on which three thermistors are mounted spaced-apart and the board is dimensioned for insertion in the access passage, herein a tube, mounted next to the outer tank wall of the water heater, as illustrated in FIG. 1.

With reference to FIG. 2 there is shown a fragmented plan view of a printed circuit board 25 formed as a straight elongated flat rectangular support for mounting temperature sensors, herein thermistors 26 at spaced locations thereon. The thermistors have their leads secured to printed conductive strips 27 which lead to an end junction 28 to which wires of a cable 29 are attached with the cable exiting the open top end through a clamp secured to a closure plate 24' mounted on the top wall 22 of the water heater outer casing 13, as illustrated in FIG. 1. The cable 29 is secured to a controller device 30 through which the operation of the resistive heating elements 16 is controlled. A dc supply cable 31 is also connected to the end junction to supply the required voltage to the thermistors 26. The printed circuit board assembly is inserted into the tube 11' from the open top end and the clamp 24' supports the circuit board 25 suspended in the tube 11'. Also, the tube 11' may have a bottom wall to support the circuit board thereon in position inside the tube with the thermistors located at the desired locations. As shown in FIG. 5, the circuit board 25 has a width slightly smaller than the inner diameter of the tube 11' for close sliding fit therein. Accordingly, the thermistor leads and printed conductors are prevented from contacting the metal tube 11'.

Other supports may be devised for positioning the thermistors at distinct locations in the tube 11', such as a rod of non-electrically conductive material on which the sensors and its associated wiring is disposed. Such a support rod would also have insulating spaces to prevent contact of the conductors with the tube inner surface to cause an electrical short circuit.

Figure 3:
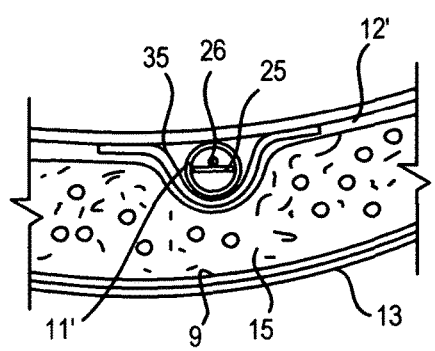
FIG. 3 is a fragmented sectional view illustrating a different means of securing the metal tube passage against the tank wall.
Figure 4:
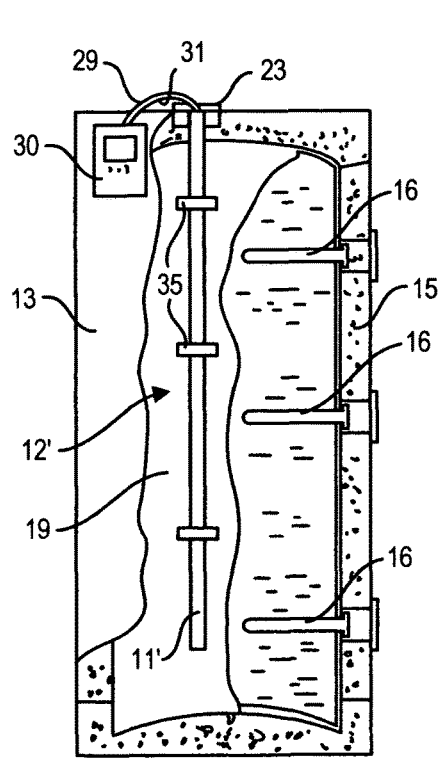
FIG. 4 is a simplified fragmented side view of a water heater adapted with the metal tube access passage of the present invention for mounting temperature sensors.

Referring now to FIGS. 3 and 4, there is illustrated another example of the securing means for the tube 11'. As herein shown the tube 11' is secured to the outer surface 19 of the tank wall 12' by adhesive tapes 35. Once the foam is injected, the tube is firmly held against the outer surface of the tank wall. With this securing means the tube need not be located adjacent the heating elements flanges 17 and held by a bracket.

Figure 7:
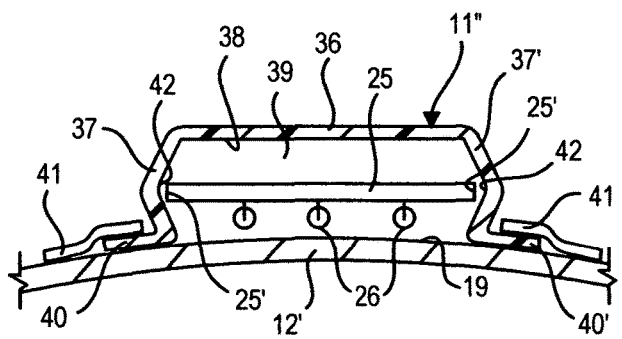
FIG. 7 is a further fragmented sectional view illustrating a further embodiment of the construction of the access passage herein formed by a U-shaped plastic extrusion shaped to hold the circuit board in sliding fit therein next to the tank wall.

Referring now to FIG. 7, there is illustrated a further example of the construction of the access passage 11. As shown, the passage 11 is formed by an elongated straight U-shaped plastic channel 11" secured against the outer surface 19 of the tank side wall 12'. The channel 11" may also be formed of suitable heat conductive metal, such as stainless stainless steel. The channel 11" defines a base wall 36 and opposed side walls 37 and 37' shaped to define a longitudinal through 38 with the passage being defined by the space 39 formed by the longitudinal through 38 and the outer surface 19 of the tank side wall 12'. The U-shaped metal channel 11" is also formed with opposed flanges 40 and 40' shaped for contact with the outer surface 19 of the tank side wall for attachment by adhesive tape 41 disposed thereover and the outer surface of the tank side wall. The opposed side walls 37 and 37' are shaped to define a V-shaped recess 42 to receive opposed side edges 25' of the circuit board 25 in close slid ding fit there between with the thermistors 26 closely spaced to the tank side wall 12'.

What follows is a summary of the method of removably mounting temperature sensors adjacent a water tank of a water heater to obtain temperature readings representative of the water temperature inside the water tank at distinct locations thereof, namely the bottom, middle and top portions of the water tank. An elongated vertical conduit is disposed next to the outer surface 19 of the water tank 12, with the conduit having an open top end 24. Two or more temperature sensors, three thermistors 26 illustrated in FIG. 2, are mounted and secured on a support, herein an elongated rectangular thin printed circuit board 25 for positioning the thermistors inside the conduit or tube 11' at distinct locations. The wiring to the thermistors are connected to a controller device which monitors the resistive values of the thermistors representative of the water temperature in the tank adjacent the thermistors and which are utilized to control the operation of the resistive heating elements as necessary by a provider or the utility or a set program in the controller device accessible by the customer. The access passage herein the tube 11' is held vertically in place by brackets 20 or adhesive tape 35.

It is within the ambit of the present invention to cover obvious modifications of the preferred embodiment and examples described herein, provided such modifications fall within the scope of the appended claims.

The invention claimed is:

1. An elongated access passage for removable mounting of temperature sensors adjacent a water tank of a water heater, said access passage being disposed vertically next to an outer surface of a water tank wall of said water heater, said access passage being dimensioned to receive two or more temperature sensors secured on a support thereof from a top access opening of said passage for positioning said two or more temperature sensors at predetermined positions therein for sensing actual temperature surrounding said two more temperature sensors at said distinct locations, each sensor of said two or more temperature sensor independently providing temperature signals representative of the temperature of water within said tank in the immediate vicinity of said sensor along said access passage, said access passage being formed as a metal conduit having at least a portion thereof all along said metal conduit in contact communication with an exterior surface of said water tank to conduct heat from said water tank whereby the heat inside said conduit is representative of the heat of said tank wall and which heat varies along said conduit in relation to the heat of said exterior surface of said tank, said support being an elongated circuit board dimensioned for sliding fit inside said metal conduit.

2. The temperature access passage as claimed in claim 1 wherein said access passage is formed by a straight metal conduit disposed against said outer surface of said water tank wall.

3. The temperature access passage as claimed in claim 2 wherein said conductive metal conduit is a tube formed from thin sheet stainless steel.

4. The temperature access passage as claimed in claim 3 wherein said thin sheet stainless steel has a thickness of about 2 mm.

5. The temperature access passage as claimed in claim 2 wherein there is further provided holding means for retaining said metal conduit substantially vertically next to said outer surface of said water tank wall.

6. The temperature access passage as claimed in claim 5 wherein said holding means is a bracket having an attachment portion secured to a resistive heating element support flange and a passage defining portion for retaining said metal conduit next to said outer surface of said water tank wall, therebeing at least two of said bracket with said passage defining portion of said at least two brackets being vertically aligned with each other to receive said straight metal conduit.

7. The temperature access passage as claimed in claim 6 wherein said passage defining portion is formed by a pair of spaced apart arms bent in the direction of said water tank wall to define a trapped space therebehind and to one side of said resistive heating element support flange.

8. The temperature access passage as claimed in claim 1 wherein said access passage is formed by a U-shape channel secured against said outer surface of said water tank wall, said channel having a base wall and opposed side walls to define a longitudinal through, each said opposed side walls being shaped to define a recess to receive opposed side edges of said elongated rectangular circuit board in close sliding fit therebetween to prevent transverse displacement thereof, said circuit board constituting said support, said passage being defined by the space formed by said longitudinal through and said outer surface of said water tank wall.

9. The temperature access passage as claimed in claim 8 wherein said U-shaped channel is formed of metal or plastic material.

10. The temperature access passage as claimed in claim 8 wherein there is further provided securing means for retaining said channel against said outer surface of said water tank wall.

11. The temperature access passage as claimed in claim 10 wherein said securing means is further provided by an expandable foam insulation disposed over said metal channel and said outer surface of said water tank wall.

12. The temperature access passage as claimed in claim 1 wherein said access passage has an open top end, said open top end constituting said top access passage, said open top end being accessible from a top wall of an outer casing disposed about said water tank and insulated therefrom by an expandable foam insulation disposed in a gap formed between said water tank and said outer casing, and a removable cover closing said open top end.

13. The temperature access passage as claimed in claim 1 wherein said one or more temperature sensors are thermistors, there being at least two or three of said thermistors secured to said printed circuit board, conductors on said printed circuit board to which said thermistors are connected and a wire cable secured to said conductors and exiting said access opening of said passage for connection to a controller device disposed outside said water heater to provide actual temperature signal values to said controller device, said wire cable being immovably clamped to a removable cover plate on a top wall of an outer casing of said water heater to support said circuit board in position in said access passage.

\* \* \* \* \*